United States Patent [19]

Crane et al.

[11] 4,434,856
[45] Mar. 6, 1984

[54] GARDEN PLOW WITH SUPPORT MEANS OPERATIVE TO INVERSELY ANGULARLY DISPLACE EARTHWORKING TOOL

[76] Inventors: John H. Crane, deceased, late of Heflin, Ala.; Foy Aline Crane, executrix, Rte. 3, Heflin, Ala. 36264

[21] Appl. No.: 300,492

[22] Filed: Sep. 9, 1981

[51] Int. Cl.³ .......................... A01B 3/50; B62D 51/04
[52] U.S. Cl. ........................................ 172/256; 172/42
[58] Field of Search ................... 172/42, 43, 256, 258, 172/259, 260; 180/19 R, 19 S, 19 H

[56] References Cited

U.S. PATENT DOCUMENTS

| | | | |
|---|---|---|---|
| 1,213,260 | 1/1917 | Rendle | 180/19.1 |
| 1,288,805 | 12/1918 | Beeman et al. | 172/260 |
| 1,308,445 | 7/1919 | Phelps | 172/260 |
| 1,426,383 | 8/1922 | Hodge | 172/260 |
| 2,169,079 | 8/1939 | Bosworth et al. | 180/19.1 |
| 2,260,344 | 10/1941 | Shaw | 172/260 |
| 2,816,496 | 12/1957 | Hall | 172/256 |
| 3,160,123 | 12/1964 | Roguemore | 172/42 |
| 3,375,645 | 4/1968 | Miller | 180/19.1 |
| 3,502,153 | 3/1970 | Bradshaw et al. | 172/43 |

FOREIGN PATENT DOCUMENTS 2382363 11/1978 France ................. 172/256

Primary Examiner—Richard T. Stouffer
Assistant Examiner—B. Honaker
Attorney, Agent, or Firm—Harvey B. Jacobson

[57] ABSTRACT

Longitudinally extending main and motor and drive frames are provided with the frames supported from each other for relative angular displacement about a horizontal central axis extending longitudinally of the frames and about an upstanding axis spaced centrally intermediate the opposite ends of the frames. The motor and drive frame include motor driven ground engageable drive structure and the main frame includes support structure for supporting a depending earthworking tool. Adjustment structure is provided for releasably retaining the main and motor and drive frames in adjusted angularly displaced positions relative to each other about both the horizontal and upstanding axes and the motor and drive frame includes rear elevated hand grip structure angularly displaceable with the motor and drive frame relative to the main frame. Further, the support structure for the depending earthworking tool is oscillatably supported from the main frame for angular displacement about a horizontal axis extending longitudinally of the main frame and control structure is provided for adjustably angularly displacing the support structure relative to the main frame inversely relative to angular displacement of the motor and drive frame relative to the main frame.

2 Claims, 9 Drawing Figures

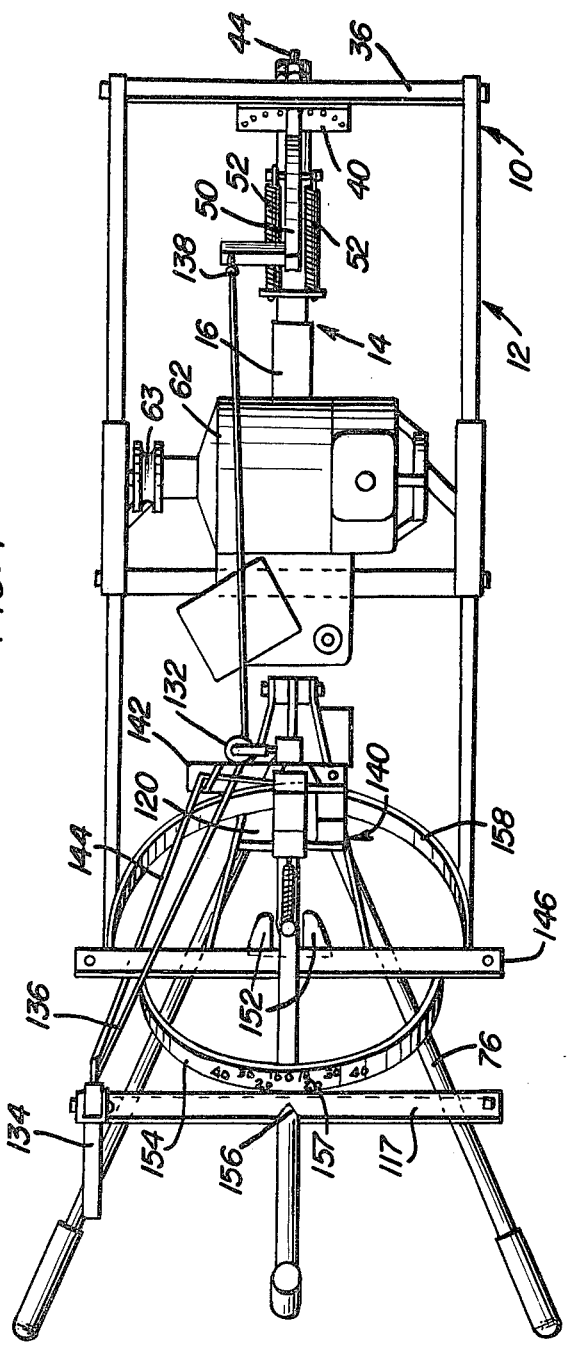
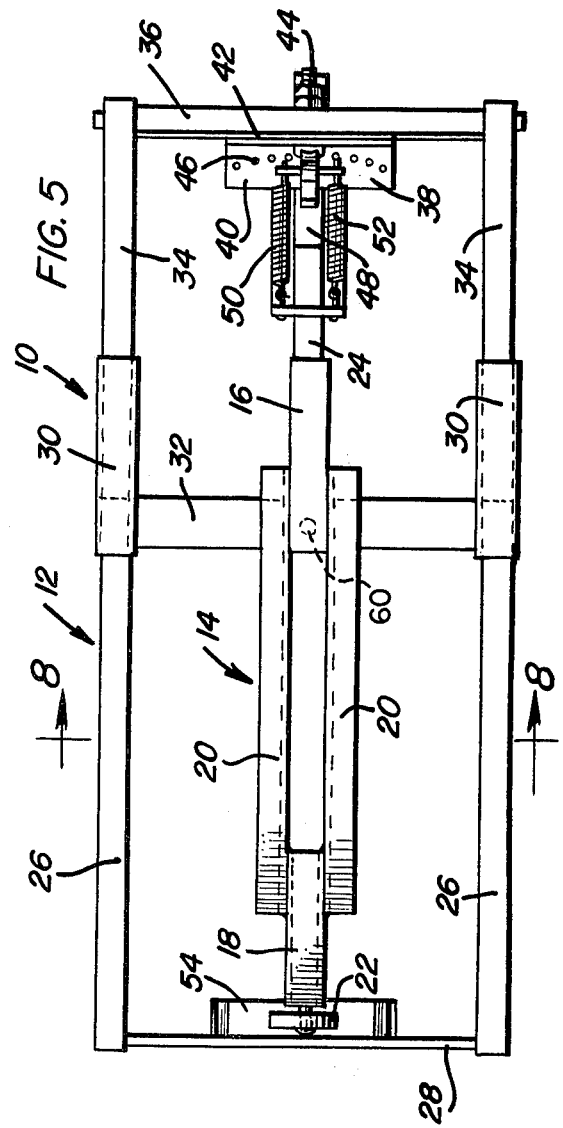

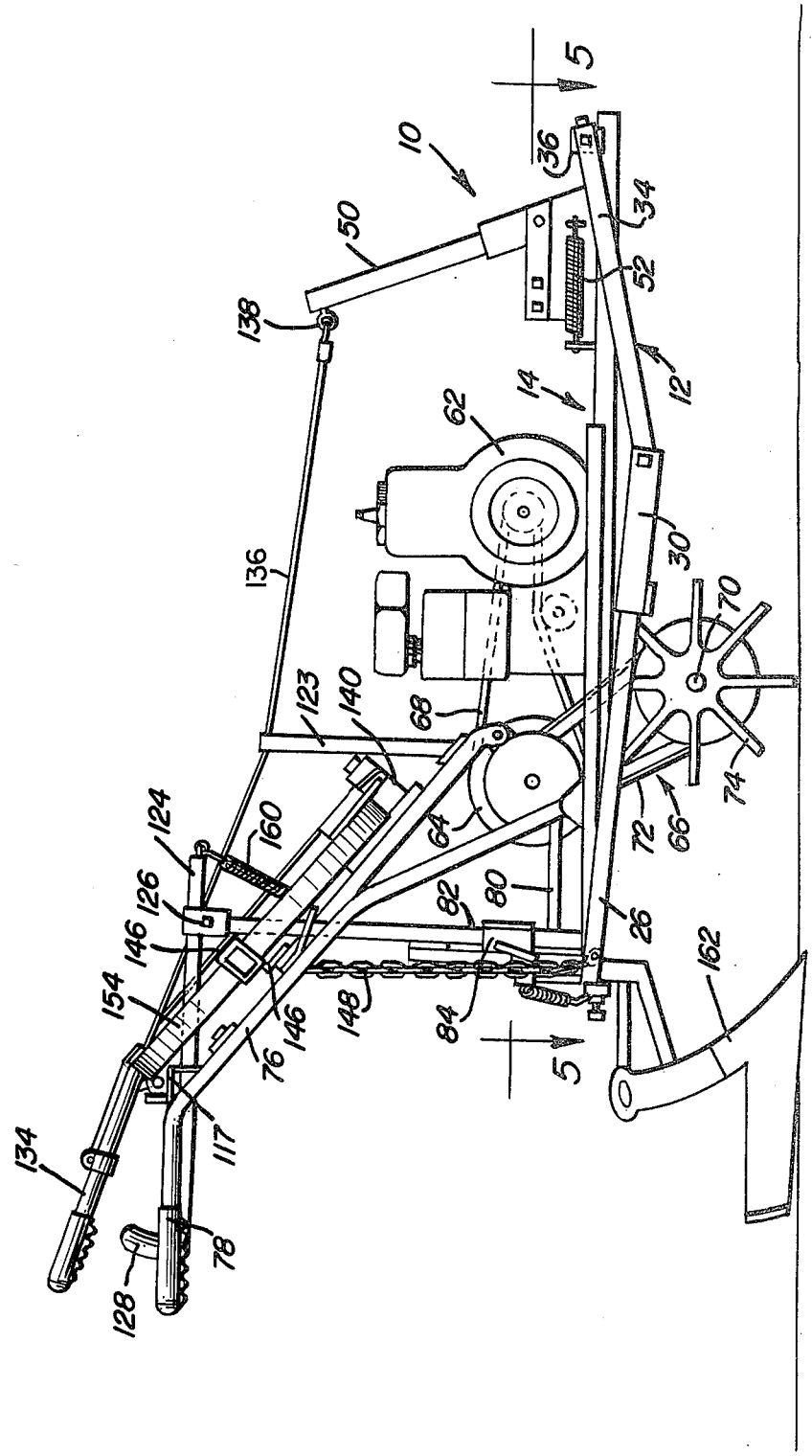

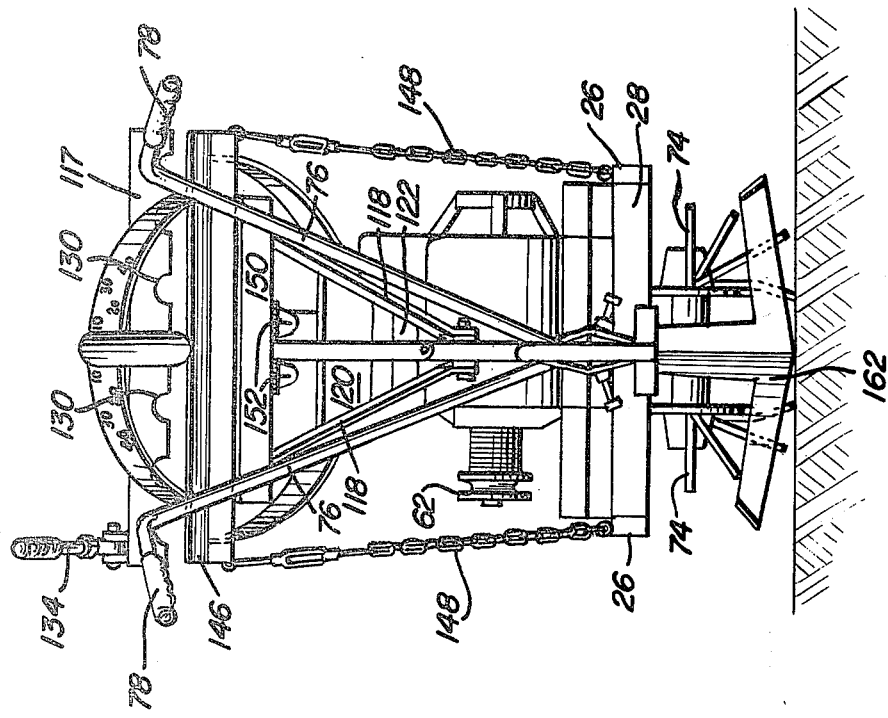
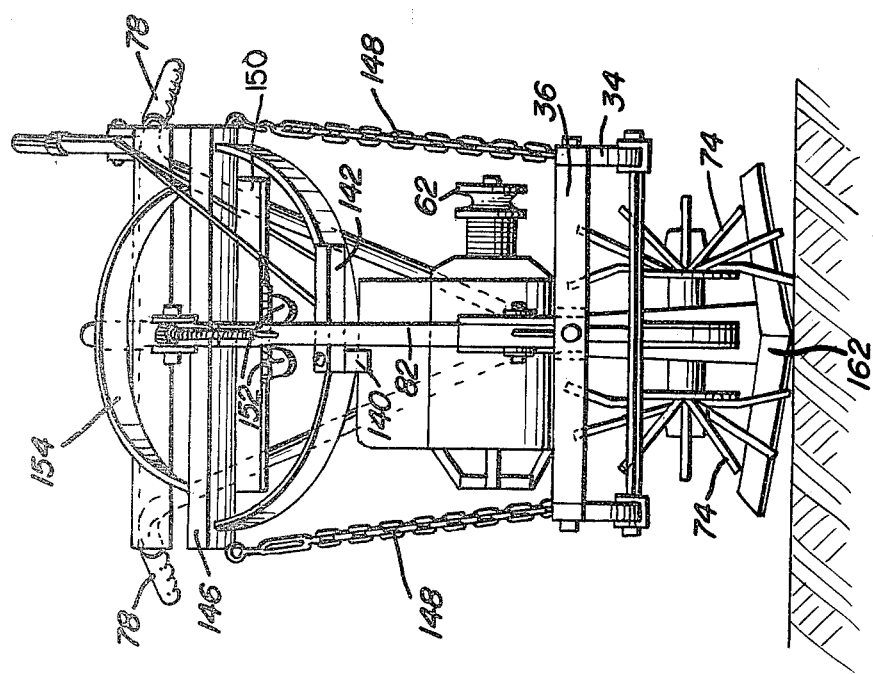

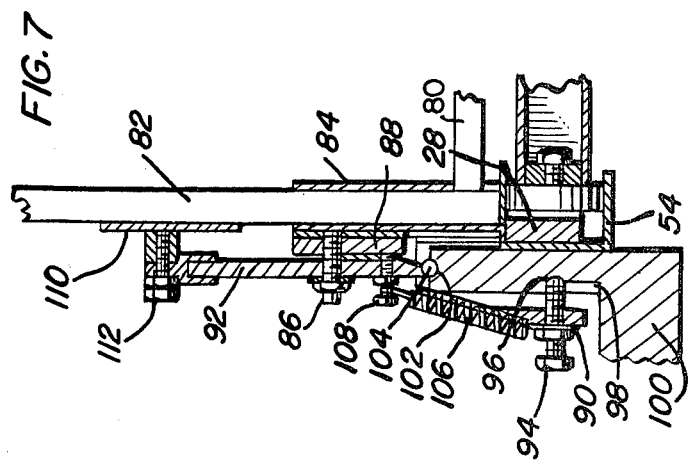
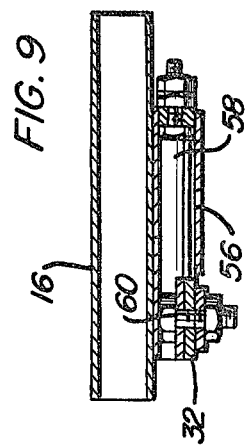
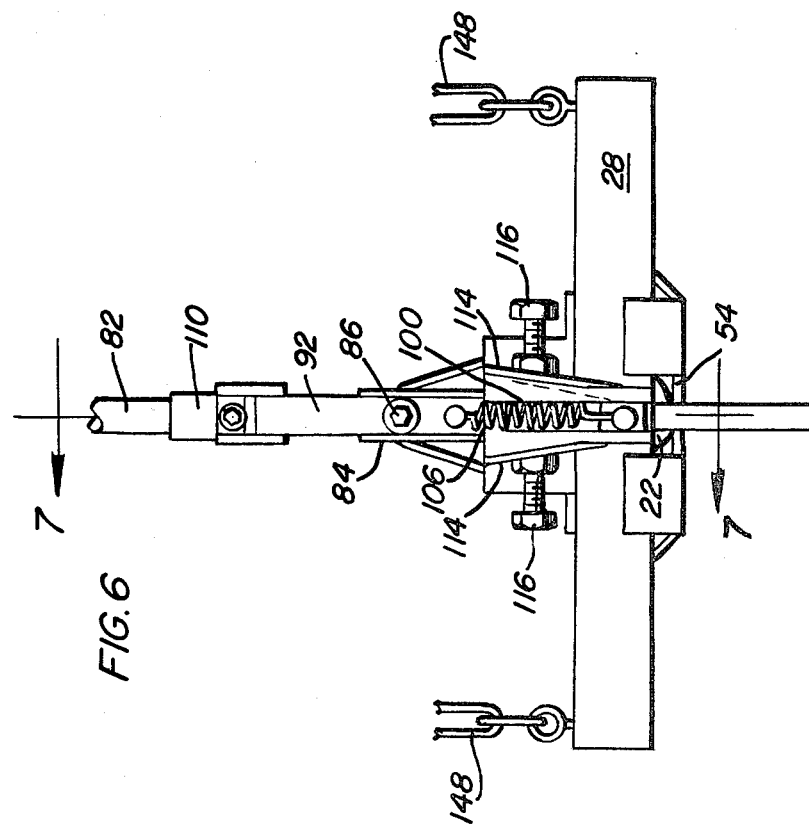
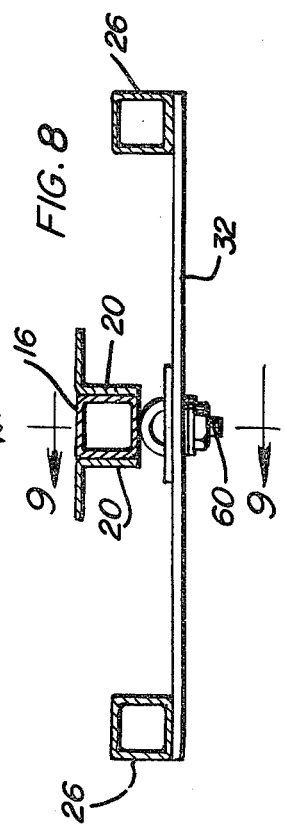

GARDEN PLOW WITH SUPPORT MEANS OPERATIVE TO INVERSELY ANGULARLY DISPLACE EARTHWORKING TOOL

BACKGROUND OF THE INVENTION

Self-powered tractors of the type an operator must walk behind or trail behind on a sulky heretofore have been provided and many of these self-powered tractors have included various adjustments for the earthworking tools to be supported therefrom. However, when preparing a garden for ease in subsequent cultivating as a result of a single pass between rows of crops and when cultivating or plowing across a slope, it is extremely important that earthworking tools (cultivators) track precisely behind the tractor and it is desirable from a comfort standpoint that plows and other earthworking implements, when traversing a slope, may orient themselves with the slope of the land independent of the handles or other controls of the associated tractor.

Some forms of previously known tractors include various groundworking tool and handle adjustments, but these are not specifically provided both to assure proper tracking and the ability of earthworking tools to be inclined according to the slope of the land while maintaining the handle assembly of the tractor generally horizontal.

Examples of previously known forms of tractors and other similar devices including some of the general structural and operational features of the instant invention are disclosed in U.S. Pat. Nos. 2,211,260, 2,597,662, 2,260,344, 2,763,193, 2,827,842 and 3,502,153.

BRIEF DESCRIPTION OF THE INVENTION

The garden plow of the instant invention includes elongated longitudinally extending main and motor and drive frames with a ground engageable motor driven support and drive assembly mounted from the motor and drive frame and the main frame provided with structure for supporting depending earthworking tools. The main and motor and drive frames are supported from each other for relative angular displacement about an axis extending horizontally longitudinally of the frame and for angular displacement relative to each other about an upstanding axis centrally located intermediate the opposite ends of the frames. Further, structure is provided for releasably retaining the main and motor and drive frames in relative angularly adjusted positions.

The motor and drive frame utilizes a rotary cultivator type support and drive unit, but it may also be equipped with opposite side driven wheels in lieu of rotary cultivator tines.

The main object of this invention is to provide a garden plow which may be utilized for precise cultivating between rows of plants with a single pass of the plow and to further provide a plow which may be utilized to cultivate or plow across a slope in a manner such that the handle assembly of the plow is horizontally disposed while the earthworking tool or tools supported from the plow are inclined according to the slope of the land.

Another object of this invention is to provide a garden plow including numerous adjustments for proper tracking of groundworking implements while cultivating between adjacent rows of plants to enable cultivation of the ground between the plant rows in close proximity to the latter.

Still another important object of this invention is to provide a garden plow constructed in a manner whereby the ground implement supporting portion of the plow may be laterally adjusted, to either side, relative to the longitudinal center line of the ground engaging drive structure of the plow.

A final object of this invention to be specifically enumerated herein is to provide a garden plow in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of a garden plow constructed in accordance with the present invention, some of the minor structural and operational features of the invention being omitted for clarity of illustration of the major structural components of the plow;

FIG. 2 is a side elevational view of the garden plow;

FIG. 3 is a front elevational view of the garden plow;

FIG. 4 is a rear elevational view of the garden plow;

FIG. 5 is a top plan view of the main and motor and drive frames of the plow;

FIG. 6 is a fragmentary enlarged rear elevational view of the plow;

FIG. 7 is a vertical sectional view taken substantially upon the plane indicated by the section line 7—7 of FIG. 6;

FIG. 8 is a vertical transverse sectional view taken substantially upon the plane indicated by the section 8—8 of FIG. 5; and FIG. 9 is a fragmentary longitudinal vertical sectional view taken substantially upon the plane indicated by the section line 9—9 of FIG. 8.

DESCRIPTION OF THE PREFERRED EMBODIMENT

Referring now more specifically to the drawings, the numeral 10 generally designates the garden plow of the instant invention including a main frame referred to in general by the reference numeral 12 and a motor and drive frame referred to in general by the reference numeral 14. The motor and drive frame comprising front and rear tubular members 16 and 18 interconnected by opposite side longitudinal angle irons 20. The rear end of the rear tubular member 18 rotatably journals a support roller 22 therefrom and the forward tubular member 16 includes a forwardly projecting inner telescopic extension 24.

The main frame 12 includes opposite side longitudinal members 26 interconnected at their rear ends by a rear transverse member 28. The forward ends of the members 26 include sleeve extension tubes 30 secured thereto and a transverse brace 32 extends between and interconnects the extension tubes 30. In addition, the main frame 12 includes a pair of forward extensions 34 whose rear ends are telescopingly received within the extension tubes 30 and whose forward ends are interconnected by a forward transverse member 36 extending and secured therebetween. The midportion of the forward transverse member 36 includes an L-shaped support member 38 including a horizontal flange 40 and a vertical flange 42. The vertical flange 42 is horizontally apertured and pivotally supported from the midportion of the front transverse member 36 by a pivot fastener 44. The horizontal flange 40 is provided with longitudinally spaced apertures 46 and the forward end of the extension 24 includes a locking pin assembly 48 including a retractable pin (not shown) and slidably engaged with the horizontal flange 40. The retractable pin of the locking pin assembly 48 is engagable in a selected aperture 46 formed in the horizontal flange 40 and the locking pin assembly 48 further includes a pivoted actuating lever 50. A pair of springs 52 are interconnected between the extension 24 and the actuating lever 50 and yieldingly bias the actuating lever 50 to a position with the aforementioned pin engaged in one of the apertures 46. The upper end of the actuating lever may be pulled rearwardly in order to retract the aforementioned pin and thus free the extension 24 for lateral swinging relative to the horizontal flange 40.

The rear transverse member 28 includes a transversely extending wheel track 54 with which the support roller 22 is rollingly engaged and the forward tubular member 16 has a pivot sleeve rigidly supported from the underside thereof. A pivot shank 58 is journaled through a sleeve 56 stationarily supported from the tubular member 16 and the rear end of the shank 58 includes a depending pivot fastener 60 rotatably received and secured through the transverse brace 32. Thus, the main frame and motor and drive frame are supported from each other for relative angular displacement both about an axis extending generally longitudinally of the motor and drive frame and an upstanding axis defined by the pivot fastener 60. Angular displacement of the motor and drive frame 14 about the shank 58 and the pivot fastener 60 relative to the main frame 12 may be retained by insertion of the aforementioned pin of the locking pin assembly 48 in one of the apertures 46.

With attention now invited more specifically to FIGS. 1, 2, 3 and 4 of the drawings, a suitable engine 62 is supported from the motor and drive frame 14 and includes a rotatable power output pulley 63 drivingly coupled to the input pulley 64 of a chain drive assembly referred to in general by the reference numeral 66 by an endless flexible belt 68. The chain drive assembly 66 includes a lower output shaft 70 driven from the input pulley 64 by a chain 72 and opposite end portions of the output shaft 70 include spiked support and drive wheels 74. It is to be noted that the drive wheel 74 may be in the form illustrated. However, the wheel 74 may also be in the form of rotary tiller wheels or more conventional tire equipped wheels, if desired.

The motor and drive frame 14 includes a pair of rearwardly and upwardly inclined and divergent handle bars 76 terminating rearwardly in horizontal hand grip portions 78. The handle bars 76 are interconnected by a front-to-rear extending brace 80 with the brace 80 extending rearwardly from the lower ends of the handle bars 76 and being secured at its rear end to the lower end of a standard 82. The lower end portion of the standard 82 supports a mounting sleeve 84 therefrom and the mounting sleeve 84 carries a rearwardly projecting pivot pin 86 rotatably received through an upper transverse brace 88 mounted rigid with the transverse member 28. In addition, a lower transverse brace 90 is mounted rigid with the transverse brace 28.

An axially adjustable pivot fastener 94 is threadedly engaged with the lower transverse brace 90 and includes a rounded forward end 96 seatingly received in a rearwardly opening socket 98 formed in an earthworking tool support shank 100. The upper end portion of the support shank 100 above the pivot fastener 94 includes an upwardly opening spherical socket 102 in which a spherical lower terminal end 104 carried by the lever 92 is seated. An expansion spring 106 is connected between the pivot fastener 94 and an anchor 108 carried by the lever 92 and thereby yieldingly biases the lever 92 and the upper end of the shank 100 toward vertically aligned positions.

The standard 82 includes a mount 110 thereon above the mounting sleeve 84 and the upper end of the connecting lever 92 is pivotally anchored relative to the mount 110 by a pivot fastener 112.

The transverse member 28 includes opposite side mounts 114 (see FIG. 6) supported therefrom and each of the mounts 114 threadedly supports a stop bolt 116 therefrom against which the upper end of the support shank 100 is abuttingly engageable to limit oscillation of the support shank 100 about the pivot fastener 94.

A transverse brace 117 extends and is secured between the upper ends of the handle bars 76 and a pair of forwardly and downwardly convergent braces 118 have their upper end portions supported from upper portions of the handle bars 76 and their lower end portions anchored relative to the upper portion of the housing of the chain drive assembly 66. A mounting plate 120 extends between and is supported from the longitudinal midportions of the braces 118. Also, a lower mount 122, see FIG. 4, extends between and is secured to the forward ends of the braces 118 and the mount 122 supports the lower end of an upright standard 123 therefrom, see FIG. 2. The upper end of the standard 82 has the forward end portion of a detent level 124 pivotally supported therefrom as at 126 and the rear end of the lever 124 includes a hand grip 128 supported therefrom, an intermediate portion of the detent lever 124 being engageable in a selected notch of a plurality of downwardly opening notches 130 formed in the transverse brace 117. The upper end of the standard 123 supports a pulley 132 therefrom and an actuating lever 134 is pivotally supported from the left end of the transverse brace 117 and has one end of a first elongated tension member 136 anchored relative thereto. The tension member 136 extends to and about the pulley 132 and the other end of the tension member 136 is anchored relative to the upper end of the actuating level 50 as as 138, see FIGS. 1 and 2.

A cam-type clamp assembly referred to in general by the reference numeral 140 is supported from the mounting plate 120 and includes a pivoted actuating arm 142 to which one end of a second elongated flexible tension member 144 is secured, see FIG. 1. The other end of the tension member 144 is also anchored to the actuating lever 134. The handle bars 76 support a transverse horizontal control and balancing arm 146 and the opposite ends of the control and balancing arm 146 are anchored to opposite rear corners of the main frame 12 through the utilization of adjustable length flexible tension members 148 extending and secured between the control and balancing arm and the rear corners of the main frame 12. Further, a plate 150, see FIG. 4, extends and is secured between the upper end portions of the handle bars 76 and includes a pair of pivoted abutment tongues 152 supported therefrom disposed on opposite sides of an adjacent portion of the standard 82.

A semi-cylindrical degree indicating band 154 is supported from the rear side of the control and balancing arm 146 and the longitudinal midportion of the transverse brace 117 includes a pointer 156 supported therefrom registrable with the indicia 157 formed on the degree indicating band 154. Also, a semi-cylindrical adjustment band 158 is anchored at its opposite ends to the control and balancing arm 146 and the clamp assembly 140 is releasably engageable with selected midportions of the band 158. Also, an expansion spring 160 is operatively connected between the forward extremity of the detent lever 124 and a suitable anchor provided therefor on an upper portion of the standard 82 spaced below the detent lever 124. Thus, the expansion spring 160 yieldingly biases the detent lever 124 to a position with the rear end portion of the detent lever 124 seated in a corresponding notch 130.

The support shank 100 may have any suitable form of earthworking tool supported therefrom such as the winged sweep 162 illustrated in FIG. 2. The toothed wheels 74 carried by the output shaft 70 are capable of supporting the plow 10 and driving the latter along the ground while the tool 162 works the ground.

By pressing downwardly on the actuating lever 134, the clamp assembly 140 is released and the actuating lever 50 is angularly displaced in order to withdrawn the latch pin from a selected aperture 46. At this point, either one of the abutment flaps or tongues 152 may be swung upwardly in order to enable lateral displacement of the standard 82 therepast. Thereafter, the free rear end of the detent lever 124 may be depressed and the upper end of the standard 82 may be laterally displaced past the upwardly swung flap or tongue 152 and the detent lever 124 may be selectively seated in the next notch 130. At the same time, either one of the handle bars 76 may be downwardly and laterally depressed so as to shift the rear tubular member 18 and the roller 22 toward one end of the wheel track 54, thereby not only relatively angularly displacing the main frame 12 relative to the motor and drive frame 14 about a longitudinal horizontal axis, but also relatively angularly displacing the main frame 12 relative to the motor and drive frame 14 about the central upstanding axis defined by the pivot fastener 60. Of course, after these adjustments have been made, the actuating lever 134 may be returned to its original position, whereby the clamp assembly 140 and pin lock assembly under the control of the actuating lever 50 may be actuated in order to retain the frames 12 and 14 in their adjusted relatively angularly displaced positions.

With attention now invited more specifically to FIGS. 6 and 7 of the drawings, as the upper end of the standard 82 is swung to the left about the pivot pin 86, the upper end of the control lever 92 is also swung to the left. However, the lower terminal end 104 of the control lever 92 is swung to the right. Thus, the upper end of the support shank 100 which defines the socket 102 is swung to the right and the lower end of the support shank 100 which supports the winged sweep 162 is swung to the left. Thus, the plow 10 may be adjusted for cultivating or plowing across a sloped section of land.

It is believed apparent that numerous different adjustment combinations may be carried out as a result of the above described structural features of the plow 10 and, therefore, that the plow 10 may be adjusted for maximum performance in a large number of different cultivating and plowing situations.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A garden plow including a longitudinal main frame and a longitudinal motor and drive frame, mounting means mounting said main frame from said motor and drive frame for angular displacement about a horizontal central axis extending longitudinally of said motor and drive frame, said motor and drive frame including motor driven ground-engageable support and drive means mounted thereon, said main frame and motor and drive frame including means operative to releasably retain said main frame in predetermined adjusted angularly displaced positions about said horizontal axis relative to said motor and drive frame, said motor and drive frame including hand grip means for gripping by the operator of said plow, said main frame including support means for supporting earthworking tool means therefrom, said mounting means including means also mounting said main frame from said motor and drive frame for oscillation about an upstanding axis spaced centrally intermediate the opposite ends of said main frame, means operative to releasably retain said main frame in predetermined adjusted angularly displaced positions about said upstanding axis relative to said motor and drive frame, said main frame including support means for supporting earthworking tool means therefrom, said support means for supporting earthworking tool means from said main frame including means for mounting said tool means from said main frame for angular displacement about a horizontal axis extending longitudinally of said main frame, and means operatively connected between said motor and drive frame and said earthworking tool means support means operative to inversely angularly displace said earthworking tool means support means relative to said main frame in response to angular displacement of said main frame relative to said motor and drive frame.

2. A garden plow including a longitudinal main frame and a longitudinal motor and drive frame, mounting means mounting said main frame from said motor and drive frame for oscillation about an upstanding axis spaced intermediate the opposite ends of said main frame, said motor and drive frame including motor driven ground-engageable support and drive means mounted thereon, means operative to releasably retain said main frame in predetermined angularly displaced position about said upstanding axis relative to said motor and drive frame, said main frame including support means for supporting earthworking tool means therefrom, said mounting means also including means for supporting said main frame from said motor and drive frame for oscillation about a horizontal central axis extending longitudinally of said motor and drive frame and angularly displaceable about said upstanding axis with said main frame relative to said motor and drive frame, said motor and drive frame including means operative to releasably retain said main frame in predetermined adjusted angularly displaced positions about said horizontal axis relative to said motor and drive frame, said support means for supporting earthworking tool means from said main frame including means for mounting said tool means from said main frame for angular displacement about a horizontal axis extending longitudinally of said main frame, and means operatively connected between said motor and drive frame and said earthworking tool means support means operative to inversely angularly displace said earthworking tool means support means relative to said main frame in response to angular displacement of said main frame relative to said motor and drive frame.

* * * * *